United States Patent Office 3,375,072
Patented Mar. 26, 1968

3,375,072
PREPARATION OF PERCHLORYL FLUORIDE
Anthony W. Yodis, Whippany, and William J. Cunningham, Rockaway, N.J., assignors to Allied Chemical Corporation, New York, N.Y., a corporation of New York
No Drawing. Filed May 21, 1964, Ser. No. 369,301
10 Claims. (Cl. 23—203)

ABSTRACT OF THE DISCLOSURE

Perchloryl fluoride is prepared by reacting elemental fluorine with an aqueous solution of a water soluble inorganic metal chlorate, particularly an alkali metal chlorate.

---

This invention relates to processes for making perchloryl fluoride ($ClO_3F$), a known compound which is a colorless gas at ordinary temperatures. The gas is easily liquefied and boils at minus 47.5° °C. at standard pressure. It has excellent storage capabilities in this form. At temperatures of minus 146° C. and below, perchloryl fluoride solidifies to a white crystalline form.

Perchloryl fluoride readily supports combustion and its utility as an oxidizing agent, such as in the dye industry, is well known. It is further known to be useful as a component of explosives for mining and construction.

The method of passing gaseous fluorine over solid potassium chlorate ($KClO_3$) was first investigated by H. Bode and E. Klesper, Z. Anorg. Allg. Chem., 266, 275–280, 1951. Perchloryl fluoride was inefficiently produced by this method, however, in small amounts.

As demand for the compound perchloryl fluoride increased, more economical methods were developed for its production, all of which were directed away from a direct fluorination approach. For example, the preparation of perchloryl fluoride has been effected by reacting antimony pentafluoride with inorganic perchlorates (U.S. Patent 2,942,947 to A. Engelbrecht) and by a catalytic modification of this process (U.S. Patent 2,982,618 to H. M. Dess).

Other processes developed for preparing perchloryl fluoride include electrolysis of perchlorates in anhydrous hydrofluoric acid (A. Engelbrecht and H. Atzwanger, Mh. Chem. 83, 1078, 1952) and the reaction of fluosulfonic acid with inorganic perchlorates (U.S. Patent 2,982,617 to W. A. LaLande).

These prior art methods suffer from the disadvantages of giving poor yields or entailing the use of rather difficult operating conditions. Electrolytic means requires the use of specialized equipment and carefully controlled operating conditions. Other known preparatory means, such as described above, require the use of more expensive and difficultly obtainable starting materials. In general these methods are characterized by higher temperature requirements and need for careful control of reaction conditions.

Accordingly, a major object of the present invention lies in the provision of processes for making perchloryl fluoride by an easily controllable liquid gas reaction which may be carried out at ordinary pressure and at relatively low temperatures, while employing relatively inexpensive and easily obtainable starting materials. In accordance with the invention it has been found that perchloryl fluoride may be prepared advantageously by reacting elemental fluorine with a water soluble inorganic chlorate, such as the alkali metal chlorates, in an aqueous medium at temperatures substantially in the range of 0° C. to 75° C. The major reaction of the invention process may be represented by $$NaClO_3 + F_2 \rightarrow NaF + ClO_3F$$

Although the basic reaction of gaseous fluorine and solid alkali metal chlorate is known, as discussed above, only very small amounts of $ClO_3F$ can be produced by this method since a variety of other reaction products are produced. Furthermore, such a reaction is not easily controlled. From a commercial viewpoint, this process has no value.

It is well known that liquid or liquid gas phase reactions have considerable advantages of specificity and simplicity of operation and control; however, fluorination in solution has been considerably restricted because of the lack of sufficiently inert solvents. A suitable solvent should have a high solubility for fluorine and yet be chemically resistant to the action of fluorine. A common solvent, such as carbon tetrachloride, for example, combines with fluorine to form a powerful chlorinating mixture, which is undesirable.

The results of a study of the reaction of fluorine with water was published by Slesser and Schram in an article entitled: "Preparation, Properties and Technology of Fluorine and Organic Fluorine Compounds," National Nuclear Energy Series, volume VII–I, 71–75, McGraw-Hill (1951). It was found that reaction of fluorine with water was unpredictable and occurred in two ways under apparently identical conditions. In some instances there was little steady reaction with no evidence of burning and on such occasions it was observed that frequent violent explosions occurred accompanied by the development of considerable heat. On other occasions, water and fluorine reacted smoothly with the appearance of a purple-blue flame.

Because of the erratic and often violent interaction of fluorine with water, it was surprising to find that water was a suitable solvent for the fluorine-alkali metal chlorate reaction and that an extremely easily controllable reaction is obtainable when fluorine is passed into aqueous alkali metal chlorate solution. Moreover, the reaction is readily carried out at ordinary temperatures and pressures.

General practice of the invention process comprises reacting elemental fluorine with sodium chlorate ($NaClO_3$) in an aqueous medium and at a temperature substantially in the range of 25° to 75° C.

More particularly, the invention may be carried out batchwise by passing fluorine gas into a reaction vessel containing an aqueous solution of alkali metal chlorate. (Continuous feeders may also be employed.) The evolved perchloryl fluoride is scrubbed to remove unreacted fluorine by passing the gases through a gas-washing solution, such as a 10–15% aqueous solution of KOH and 5% sodium hyposulfite ($Na_2S_2O_3$). Water may be used alone for this purpose. A 2% KOH aqueous scrubbing solution has been found to be particularly satisfactory, however. The gases are dried by passing them through suitable drying agents, such as calcium chloride, $CaSO_4$ (Drierite) or solid potassium or sodium hydroxide. This also serves to remove any acid gases present. The product may be collected and used directly or it may be liquefied by mechanical compression, or by refrigeration as by condensation in a liquid-nitrogen or Dry Ice acetone trap. It can then be stored in cylinders and thus made available for future use.

In another embodiment, the reaction may be carried out continuously by feeding an aqueous solution of alkali metal chlorate continuously into the upper end of a vertical packed tower-type reactor while a stream of fluorine is simultaneously introduced into the lower end of the tower. These streams may be introduced in concurrent flow; however, this method is not as effective as counter-current reaction. The evolved $ClO_3F$ leaves the reactor as a gaseous overhead product and is scrubbed, dried and condensed for storage, as described above.

Apparatus employed is relatively simple and may comprise conventional kettle reactors, equipped with suitable feed inlets, a gas outlet and facilities for selectively maintaining temperature of the reaction within predetermined ranges. The off-gas outlet may be connected to a scrubber for unreacted fluorine and a liquid-nitrogen trap or other refrigerating means may be provided to condense perchloryl fluoride reaction product. Apparatus may be made of any suitable material, such as Hastelloy and Stainless Steel, which is corrosion-resistant to reactants and products involved. Glass may also be used but is subject to attack by fluoride. Suitable stirring means such as a Teflon covered magnetic bar used in conjunction with a magnetic stirrer may be used to agitate the solution. In continuous operation, a vertical packed tower-type reactor may be used, such as nickel, 1″ I.D. x 10″ long, sealed at one end and threaded with a cap at the other. The cap is fitted with suitable corrosion-resistant tubing in such a manner that fluorine gas may be bubbled below the surface of the liquid contained within the tube.

Reaction may be carried out over a relatively wide range of temperatures, from about 0° to 75° C. Conversions and yields do not vary significantly over this range. For convenience, however, the preferred temperature range for the reaction is 25° to 50° C. Temperatures in the range of 25° to 75° C. may be used advantageously.

While sub- or superatmospheric pressures may be employed, the invention affords the advantage of operation at substantially atmospheric pressure. It will be understood, however, that pressures in systems in which a gas stream is flowed through reaction systems are sufficiently on the positive side to effect commercially satisfactory gas flow through the apparatus train. Thus, although strictly speaking actual pressures in systems of the kind under consideration may vary from 2 up to say 10–15 pounds gauge; depending on such factors as apparatus design, desired contact time, etc., operations of this type are included in the designation of substantially atmospheric pressure.

Residence time may be varied considerably without noticeable disadvantage to high process efficiency. Significant conversions are effected at residence times as short as one second or as high as one hour. The preferred residence time range, however, has been found to lie between one and ten minutes. The optimum residence time in a given run may be determined by test and to a substantial extent depends upon such interrelated factors as reactor temperature, ratio of reactants and apparatus employed. In general, the shorter the residence time the higher will be the temperature required within the described range to give optimum results.

Virtually any soluble inorganic chlorate may be used in the practice of this invention. Alkali metal chlorates are particularly useful, sodium and potassium chlorates being illustrative. Because of the high solubility of sodium chlorate in water and the relative low cost of the same; use of this salt constitutes a preferred embodiment. $NaClO_3$ is a known and commercially available, normally colorless crystalline material with a melting point of 250° C. Technical grade is suitable for use, although more pure forms may be used with improved results.

A wide range of varying concentrations of inorganic chlorate in aqueous solution may be employed in practice of the invention. Although up to a point, use of higher concentrations of sodium chlorate, for example, results in somewhat higher conversions to perchloryl fluoride; there is no material advantage obtained in using very highly concentrated solutions of the chlorate. It has been found that aqueous solutions containing from about 25 to 50% by weight of sodium chlorate, are quite satisfactory.

The fluorine and aqueous alkali chlorate may be reacted in any desired proportions. An excess of either reactant or stoichiometric amounts of the same may be employed. In large scale work, however, it is advantageous to adjust ratios of reactants and residence times so that the fluorine is substantially completely reacted and hence it is preferable to utilize less than equivalent proportions of fluorine with aqueous alkali chlorate solution and then recycle the latter.

The evolved perchloryl fluoride ($ClO_3F$) exists the reactor as a gaseous overhead product and may be recovered by conventional means such as employed in this art. Aqueous or alkali scrubbing solutions may be employed to remove unreacted fluorine and reactive gases other than perchloryl fluoride which may be formed. These scrubbing solutions may be used advantageously in conjunction with a reducing agent such as sodium thiosulfate. Solid contacting agents such as calcium chloride, calcium sulfate or potassium or sodium hydroxide may be used to dry the gaseous product. The dried gaseous product may then be condensed in a cold trap, externally refrigerated by means of liquid nitrogen or oxygen. The resulting condensate may be separated and fractionated in separate equipment if desired.

The following illustrates practice of the invention.

Example 1

A solution of 600 grams of $NaClO_3$ dissolved in 1500 mls. of water was charged into a 2 liter one-neck flask. The flask was equipped with a thermometer well, an inlet for fluorine gas and an outlet to lead effluent gases to a caustic scrubber. Elemental fluorine, at the rate of 0.1 mol per hour, was passed below the surface of the solution for 1 hour. The reaction temperature was maintained substantially between 25° and 75° C. Effluent gases were scrubbed to remove unreacted fluorine by passing the gases through a gas-washing solution consisting of a 10–15% aqueous solution of KOH and 5% sodium hyposulfate. The gases were then dried by causing them to flow through a drying tube containing NaOH pellets. The system was purged with nitrogen and 5.1 grams (0.05 mol) $ClO_3F$ were recovered. The yield of $ClO_3F$ was 50% based upon the amount of fluorine used. Infra-red spectrum and chromatographic analysis of a sample of this gas, taken over a period of one hour, showed this material to be 100% pure perchloryl fluoride, excepting for air in the sample bulb.

Example 2

Into the apparatus described in Example 1 were charged 900 grams of $NaClO_3$ in 1700 mls. of water. Elemental fluorine, at the rate of 0.1 mol per hour, was passed into the solution for a period of one hour. In place of the 10–15% aqueous scrubbing solution of KOH and 5% hypo used in the previous example, water was substituted as scrubber. Instead of sodium hydroxide pellets, Drierite (calcium sulfate) was used to dry the gas stream. Otherwise the procedure employed was the same as in Example 1. 6.0 grams (0.059 mol) of $ClO_3F$ were recovered. The yield of $ClO_3F$ was 50%, based upon the amount of fluorine consumed.

Example 3

The apparatus employed consisted of a nickel tube, 1″ (I.D.) x 10″ long, which tube was sealed at one end and threaded at the other and a cap placed thereon. The cap was fitted with ¼″ (O.D.) nickel tubing in such a manner that fluorine gas could be bubbled below the surface of the liquid contained within the tube. A solution of 10 grams of $NaClO_3$ in 100 mls. of water was charged into the nickel reactor tube. Elemental fluorine at the rate of 0.1 mol per hour, was passed into the solution for a period of one hour. The effluent gas was scrubbed and dried as in Example 2. Liquid nitrogen cooled traps were employed to condense and recover $ClO_3F$. As liquid nitrogen traps condense considerable quantities of air, it was necessary to boil this off before weighing the product. To assure that all of the air was gone, the trap was heated to −78° C. in Dry Ice acetone before weighing. 2.3 grams (0.022 mol) of $ClO_3F$ were recovered, corresponding to a yield of 22% of $ClO_3F$ based upon the amount of fluorine consumed.

*Example 4*

The apparatus consisted of a stainless steel tower packed with glass helices, used in conjunction with a Teflon bellows pump. Aqueous $NaClO_3$ solution (1200 grams of $NaClO_3$ in 3000 mls. of water) was fed continuously into the upper end of the tower, at the rate of 3 liters per hour, while elemental fluorine, at the rate of 0.1 mol per hour, was fed upwardly into the lower end of the tower. The reaction was run for ½ hour. 2.7 grams (0.026 mol) of $ClO_3F$ was condensed and recovered in a liquid nitrogen trap and identified by infra-red analysis. The yield of $ClO_3F$ was 54% based upon the fluorine consumed.

When the above-described runs were made substituting potassium chlorate for sodium chlorate; it was found that reaction proceeded smoothly as before, excepting that larger quantities of fluorine gas were carried over as unreacted, thus resulting in somewhat lower yields.

We claim:

1. The process for making perchloryl fluoride ($ClO_3F$) which comprises reacting elemental fluorine with aqueous alkali metal chlorate.

2. The process for making perchloryl fluoride ($ClO_3F$) which comprises reacting elemental fluorine with aqueous sodium chlorate.

3. The process of claim 1 in which reaction temperatures are maintained substantially in a range of 25–75° C.

4. The process of claim 1 in which a solution of aqueous alkali metal chlorate in the range of about 25 to 50% by weight of alkali metal chlorate is employed.

5. The process for making perchloryl fluoride ($ClO_3F$) which comprises fluorine gas into a reaction vessel containing an aqueous solution of alkali metal chlorate.

6. The process of claim 5 in which the reaction temperature is maintained substantially in a range of 25° to 50° C.

7. The process for making perchloryl fluoride ($ClO_3F$) which comprises continuously contacting countercurrent streams of fluorine gas and aqueous alkali metal chlorate solution.

8. The process of claim 7 in which the residence time is substantially in a range of 1 to 10 minutes and reaction temperatures lie substantially in the range of 25° to 75° C.

9. The process for making perchloryl fluoride ($ClO_3F$) which comprises reacting less than a stoichiometric amount of elemental fluorine gas with a 25–50% aqueous solution by weight of sodium chlorate for a period of time ranging from 1 to 10 minutes, at temperatures substantially in a range of 25° to 75° C. and recovering perchloryl fluoride.

10. The process of claim 9 in which aqueous sodium chlorate solution is recycled.

References Cited

UNITED STATES PATENTS 2,942,947   6/1960   Engelbrecht _____ 23—203

OSCAR R. VERTIZ, *Primary Examiner.*

H. S. MILLER, *Assistant Examiner.*